United States Patent
Gao et al.

(10) Patent No.: US 12,389,839 B2
(45) Date of Patent: Aug. 19, 2025

(54) METHOD FOR OVERWINTERING AND COLD RESISTANCE OF GRAPEVINES

(71) Applicant: HOHAI UNIVERSITY, Suzhou (CN)

(72) Inventors: Yufeng Gao, Suzhou (CN); Yulin Fang, Suzhou (CN); Lei Hang, Suzhou (CN); Kekun Zhang, Suzhou (CN); Yaqing Gao, Suzhou (CN)

(73) Assignee: HOHAI UNIVERSITY, Jiangsu (CN)

( * ) Notice: Subject to any disclaimer, the term of this patent is extended or adjusted under 35 U.S.C. 154(b) by 0 days.

(21) Appl. No.: 18/974,796

(22) Filed: Dec. 10, 2024

(65) Prior Publication Data
US 2025/0234816 A1    Jul. 24, 2025

(30) Foreign Application Priority Data
Jan. 23, 2024    (CN) .......................... 202410090872.5

(51) Int. Cl.
*A01G 13/27*    (2025.01)
*A01G 17/00*    (2006.01)

(52) U.S. Cl.
CPC .......... *A01G 13/27* (2025.01); *A01G 17/005* (2013.01)

(58) Field of Classification Search
CPC ........ A01G 13/00; A01G 13/27; A01G 17/00; A01G 17/005; A01G 22/05; A01G 24/10; A01G 24/30

USPC .......... 47/2, 32.8, 58.1 R, 58.1 SC, 58.1 SE, 47/58.1 FV

See application file for complete search history.

(56) References Cited

U.S. PATENT DOCUMENTS

| | | | | |
|---|---|---|---|---|
| 4,045,204 | A * | 8/1977 | Matsunaga | B01J 2/28 71/11 |
| 4,911,952 | A * | 3/1990 | Doane | C08L 3/12 264/4.1 |
| 5,125,770 | A * | 6/1992 | Hesseling | C08L 3/02 106/900 |
| 5,683,957 | A * | 11/1997 | Huang | A01C 1/044 47/DIG. 9 |
| 9,693,509 | B2 * | 7/2017 | Biel Borraz | A01G 13/33 |

* cited by examiner

*Primary Examiner* — David J Parsley
(74) *Attorney, Agent, or Firm* — JCIPRNET

(57) ABSTRACT

Disclosed is a method for overwintering and cold resistance of grapevines, the vines are covered with a biological solidification layer, and the method includes the following steps: placing stems of the vines in rows on a ground, and digging soil between the rows to cover the vines and stems in the rows to form a soil-covered layer; and a thickness of the soil-covered layer is such that a distance from the stems to a top of the soil-covered layer is 50-100 mm; and spraying biological solidification solution onto the soil-covered layer to form the biological solidification layer, where composition and concentration of the biological solidification solution are as follows: 0.5-2 g/L of bean flour, 0.2-1 g/L of xanthan gum, 0.2-1 g/L of cellulose, 0.5-2 g/L of urea and 0.5-2 g/L of calcium chloride. The method is safe, reliable, time-saving, and easy to operate for overwintering of vines.

7 Claims, 5 Drawing Sheets

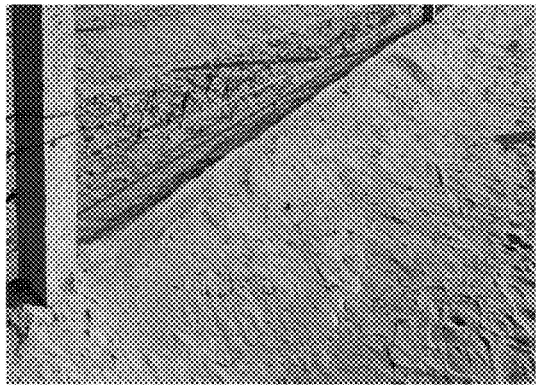
FIG. 3A  FIG. 3B
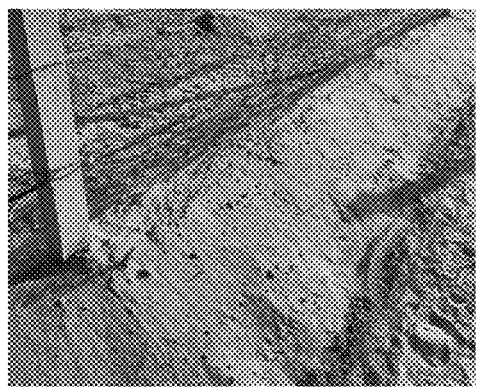
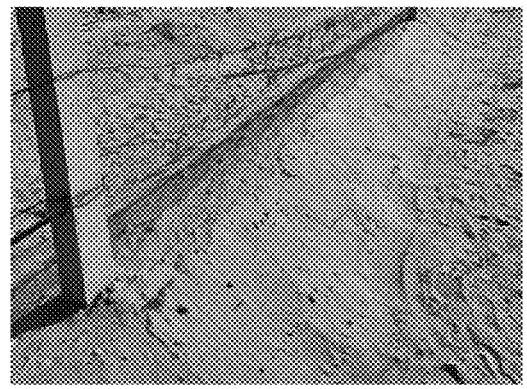
FIG. 4A  FIG. 4B

METHOD FOR OVERWINTERING AND COLD RESISTANCE OF GRAPEVINES

CROSS-REFERENCE TO RELATED APPLICATION

This application claims the priority benefit of China application serial no. 202410090872.5, filed on Jan. 23, 2024. The entirety of the above-mentioned patent application is hereby incorporated by reference herein and made a part of this specification.

BACKGROUND

Technical Field

The present disclosure belongs to the technical field of plant cultivation, and particularly relates to a method for overwintering and cold resistance of grapevines.

Description of Related Art

In desert planting areas in northern China, frost damage in winter is a key ecological factor affecting the sustainable production of plants such as grapes. These areas are cold and windy in winter. When no measures are taken, grapevines and other trees will die in large numbers in case of overwintering in situ. As a traditional way for overwintering, soil burial for cold resistance is subjected to some problems and limitations in these areas. Since these areas are sandy, a thickness of the buried soil must be sufficient to prevent plants from exposure caused by wind erosion, resulting in excessively thick coverings and increasing the difficulty of construction. When the buried soil is not thick enough, it can be easily eroded by wind, causing the grapevines to be exposed again and poor effects of the cold resistance. In addition, mechanical soil removal is required in spring of the next year, moreover, mechanical soil removal is not only time-consuming and labor-intensive, and it is difficult to control a depth of soil removal when digging, which can easily damage the plants. Therefore, researching an overwintering method for plants in a cold desert area to replace traditional frost protection measures and help the plants safely survive the winter to increase economic yields is an urgent problem to be solved.

SUMMARY

In order to overcome the problems of frost damage and wind erosion faced by vines in desert regions of northern China such as grapes producing area in winter, the present disclosure provides a method for protecting vines, particularly a method for overwintering and cold resistance of grapevines.

In order to solve the above problems, the technical solution adopted by the present disclosure is as follows:
a method for protecting vines, which covers the vines with a biological solidification layer, including the following steps:
S1. placing stems of the vines in rows on a ground, and digging soil between the rows to cover the vines and stems in the rows to form a soil-covered layer; and a thickness of the soil-covered layer is such that a distance from the stems to a top of the soil-covered layer is 50-100 mm;
S2. spraying biological solidification solution onto the soil-covered layer to form the biological solidification layer, where composition and concentration of the biological solidification solution are as follows: 0.5-2 g/L of bean flour, 0.2-1 g/L of xanthan gum, 0.2-1 g/L of cellulose, 0.5-2 g/L of urea and 0.5-2 g/L of calcium chloride; and
S3. spraying de-solidification solution onto the biological solidification layer after the protection is completed to desolidify the biological solidification layer and provide nutrients, where the de-solidification solution is composed of water-soluble monocalcium phosphate with a concentration of 0.5-1 g/L, and a use amount of the de-solidification solution is 2-5 L/m.

Preferably, the vines are grapevines.

Preferably, a preparation process of the biological solidification solution is as follows: mixing the bean flour, the xanthan gum, and the cellulose together to obtain a mixture, then stirring and dissolving the mixture in water to obtain Solution A; mixing the urea and the calcium chloride together to obtain a mixture and then dissolving the mixture in water to obtain Solution B; and mixing Solution A and Solution B in a volume ratio of 1:1 to prepare the biological solidification solution.

Preferably, time after the preparation of Solution A and time after the preparation of Solution B are not used as limiting conditions for spraying time, and the spraying time of the biological solidification solution is limited to within one hour after Solution A and Solution B are mixed.

Preferably, the bean flour in the biological solidification solution is soybean flour or sword bean flour with a particle size smaller than 0.075 mm.

Preferably, an ambient temperature during spraying of the biological solidification solution is above 0° C.

Preferably, a spraying amount of the biological solidification solution is 2-5 L/m in a direction of rows of grapevines.

Preferably, a spraying method of the biological solidification solution is to spray a same soil-covered layer twice, and an interval between the two spraying applications is no more than 7 min, such that a total spraying amount of the two spraying applications is controlled at 2-5 L/m in the direction of rows of grapevines.

Preferably, a cross-sectional geometry of a soil-covered layer is substantially triangular or trapezoidal, with a base length of 1200-1800 mm, and a top length is 300-400 mm when it is a trapezoid.

The present disclosure has the following beneficial effects:

(1) In the present disclosure, a biological solidification layer is formed by using biological solidification solution. Compared with the traditional method of soil-burial frost protection, the present disclosure not only avoids sandstorm pollution and plant exposure caused by wind erosion of the soil cold protection layer, but also reduces the thickness of the soil-covered layer by 2-4 times, greatly reducing the amount of soil burial. In addition, the solidified soil layer can effectively reduce the evaporation of moisture in soil, which is conducive to preserving the ground temperature.

(2) In the present disclosure, compositions and concentrations of the biological solidification solution and the de-solidification solution not only help the vines resist frost but also serve as nutrient fertilizers, with no need for additional fertilization and improving the efficiency of plant care. Furthermore, they can properly replace watering to prevent freezing.

(3) The present disclosure explores the spraying method of the biological solidification solution, and surprisingly finds that spraying twice within a short period of time, for example, spraying twice at an interval of 7 min between two spraying applications, can improve the solidification effects of the soil.

(4) The present disclosure explores the spraying time after the preparation of the biological solidification solution. In order to ensure the solidification quality of soil body, and in turn to guarantee the long-term cold and wind resistance, and reduce the amount of solution used, it is recommended to complete the spraying within 1 h after Solution A and Solution B are mixed. The solution should be prepared and used immediately.

(5) The method for overwintering and cold resistance of grapevines provided in the present disclosure is particularly suitable for grape producing areas. The method takes into account the growth characteristics and cold protection needs of grapevines, and adjusts the solid burial method and the concentration of the biological solidification solution accordingly. In addition, the present disclosure performs an additional step of aligning and organizing the grapevines before a soil burial process to have the grapevines gathered in one row, such that area and volume of soil burial are reduced, and the biological solidification solution is saved.

The method provided in the present disclosure is easy to operate, low in cost, has significant economic benefits, and is environmentally friendly.

BRIEF DESCRIPTION OF THE DRAWINGS

Units of numerals in the accompanying drawings are millimeters (mm).

FIG. 3A and FIG. 3B are comparison images after Plot A treated according to Example 5 of the present disclosure at an interval of 4 months: FIG. 3A. immediately after treatment; and FIG. 3B. 4 months after treatment.

FIG. 4A and FIG. 4B are comparison images after Plot B treated according to Example 6 of the present disclosure at an interval of 4 months: FIG. 4A. immediately after treatment; and FIG. 4B. 4 months after treatment.

FIG. 5A. immediately after treatment; and FIG. 5B. 4 months after treatment.

FIG. 6A. immediately after treatment; and FIG. 6B. 4 months after treatment.

DESCRIPTION OF THE EMBODIMENTS

In order to make the objectives, technical solutions, and advantages of the present disclosure clearer, the technical solutions of the present disclosure will be further described below in detail. Apparently, the examples described are merely some examples rather than all examples of the present disclosure. All the other embodiments obtained by those of ordinary skill in the art based on the embodiments in the present disclosure without creative efforts shall fall within the protection scope of the present disclosure.

In the present disclosure, the word "substantially" in the term "substantially triangular or trapezoidal" refers to a shape within an acceptable margin of error of a given value determined by those skilled in the art, which will partially depend on how the value is measured or determined, that is, the limitations of a measurement system, for example, according to the practice in the art, "substantially" may refer to within 3 or more standard deviations. Alternatively, "substantially" may refer to a range of up to 20%, preferably up to 10%, more preferably up to 5%, and even more preferably up to 1% of the given value.

Example 1 Process for Burying Grapevines with Soil and Preparation of Biological Solidification Solution This embodiment of the present disclosure uses grapevines as an example to demonstrate a plant protection method. Considering the particularity of grapevines, the present disclosure performs an additional step of aligning and organizing the grapevines before a soil burial process to have the grapevines gathered in one row, such that area and volume of soil burial are reduced, and the biological solidification solution is saved. The method includes the following steps: (1) prune the grapevines: when a temperature was low in late autumn or early winter, dead branches and leaves were pruned from the grapevines according to a given yield indicator in a timely manner, and were removed from the vineyard; (2) bundle and press down the grapevines: the grapevines on grape trellis were sorted and laid on a ground, and branches of the grapevines were then bundled with ropes and pressed down onto the ground; (3) perform soil burial: when the temperature dropped below freezing, soil was dug from between rows of grapevines to cover the grapevines with the soil; (4) prepare the biological solidification solution: bean flour, xanthan gum, cellulose, urea and calcium chloride were fully dissolved and evenly mixed to prepare the biological solidification solution; and (5) spray the biological solidification solution: the biological solidification solution was sprayed evenly onto a soil layer surface to form an insulating solidification layer, such that the grapevines could resist frost better.

Figure 1:
FIG. 1 is a physical image of a biological solidification layer formed by using a method according to an example of the present disclosure.

FIG. 1 is a physical image of a biological solidification layer formed by using a method according to an example of the present disclosure.

Specific operation of bundling and pressing down one grapevine 1 in FIG. 2A, FIG. 2B, FIG. 2C and FIG. 2D was as follows: a base of one grapevine was pressed down onto the grapevine behind, branches incapable of being be pressed down could be pressed down with soil or bundled with ropes to make then close to the ground, thereby facilitating subsequent soil burial.

The soil for soil burial was dug from a soil digging area 2 between the rows of grapevines as indicated in FIG. 2A, FIG. 2B, FIG. 2C and FIG. 2D.

A cross-sectional geometry of a soil-covered layer 3 in FIG. 2A, FIG. 2B, FIG. 2C and FIG. 2D was substantially triangular or trapezoidal, with a base length of 1200-1800 mm, a top length is 300-400 mm when it was a trapezoid, and a distance from one grapevine to a top of the soil-covered layer of 50-100 mm.

Figure 2A:
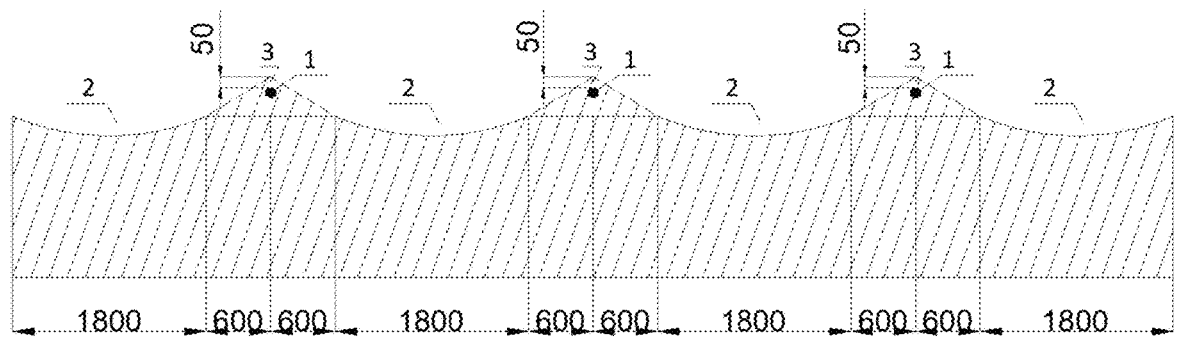
FIG. 2A, FIG. 2B, FIG. 2C and FIG. 2D are schematic diagrams of soil covering by using a method according to the present disclosure.
Figure 2B:
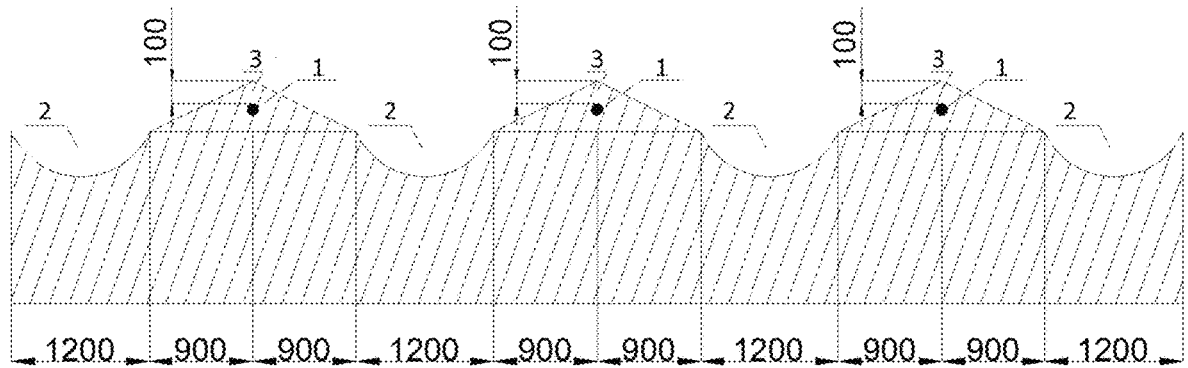
Figure 2C:
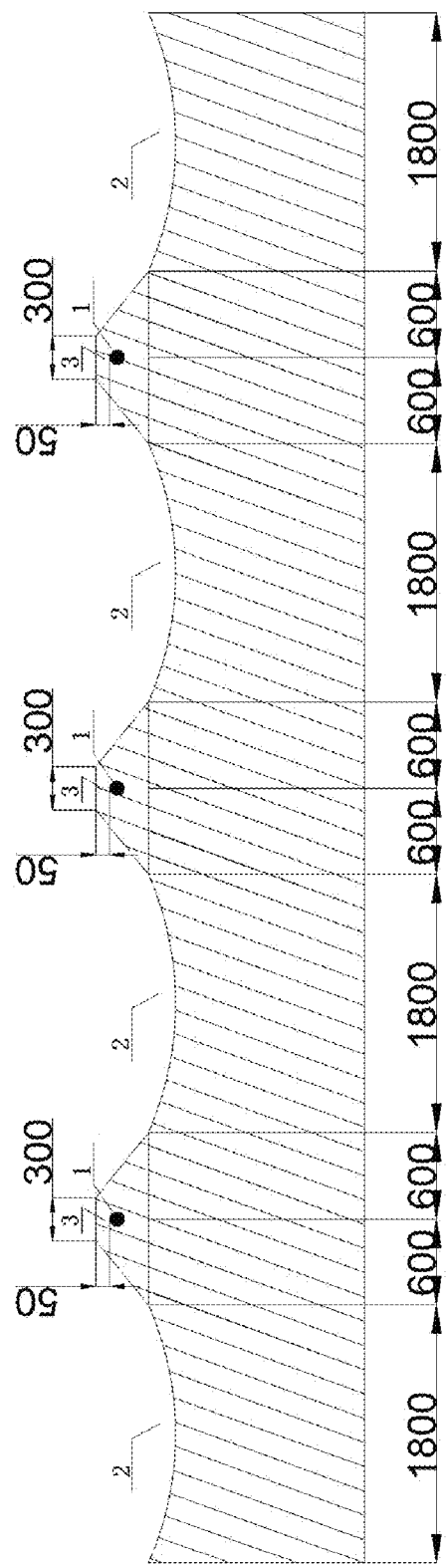
Figure 2D:
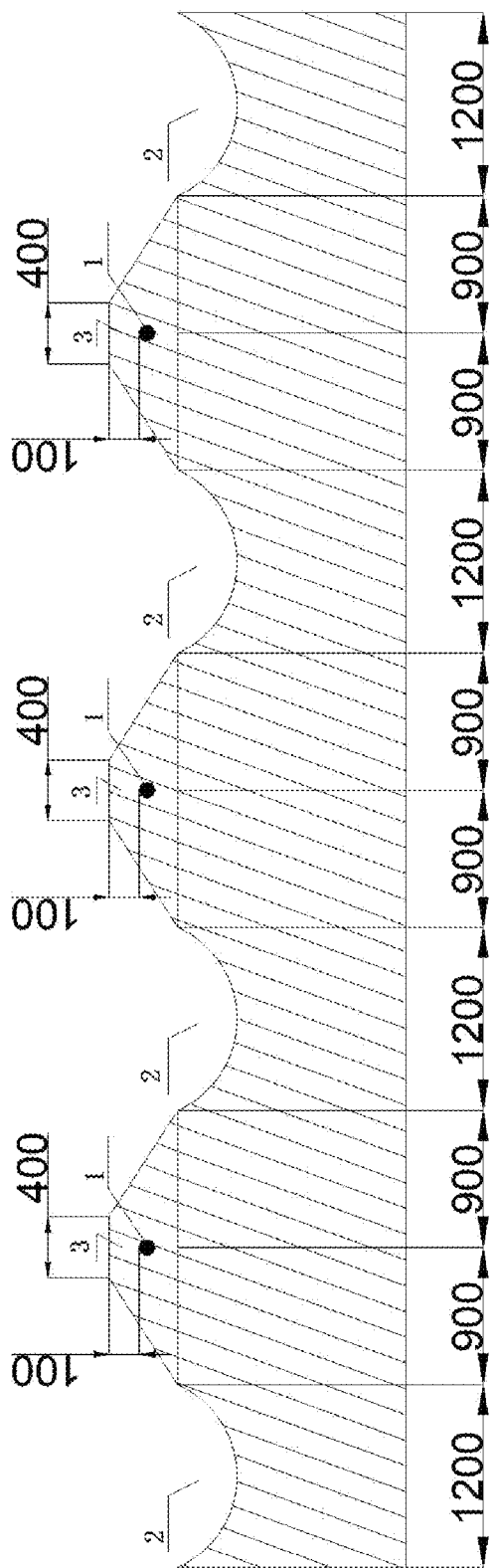

FIG. 2A. Triangular soil-covered layer, grapevine to the top of the soil-covered layer 50 mm;

FIG. 2B. Triangular soil-covered layer, grapevine to the top of the soil-covered layer 100 mm;

FIG. 2C. Trapezoidal soil-covered layer, grapevine to the top of the soil-covered layer 50 mm;

FIG. 2D. Trapezoidal soil-covered layer, grapevine to the top of the soil-covered layer 100 mm.

Composition and concentration of the biological solidification solution were as follows: 0.5-2 g/L of bean flour, 0.2-1 g/L of xanthan gum, 0.2-1 g/L of cellulose, 0.5-2 g/L of urea and 0.5-2 g/L of calcium chloride.

Specifically, the bean flour was soybean flour or sword bean flour with a particle size smaller than 0.075 mm.

The biological solidification solution was prepared by mixing Solution A and Solution B in a volume ratio of 1:1. Specifically, Solution A was prepared by fully dissolving the bean flour, the xanthan gum, and the cellulose; and in Solution A, concentrations of the bean flour, the xanthan gum and the cellulose were respectively 1-4 g/L, 0.4-2 g/L, and 0.4-2 g/L. Solution B was prepared by fully dissolving the urea and the calcium chloride, and in Solution B, the urea and the calcium chloride has concentrations of 1-4 g/L and 1-4 g/L, respectively. Solution A and Solution B could be prepared at any time, that is, they could be prepared on site or in advance.

A spraying amount of the biological solidification solution and de-solidification solution were 2-5 L/m in a direction of the rows of grapevines.

The biological solidification solution and the de-solidification solution were sprayed evenly using a conventional pesticide spraying device.

Example 2 Investigate Components of the Biological Solidification Solution

In addition, components of the biological solidification solution were investigated in the present disclosure. Biological solidification solutions of Group a-l were prepared according to the preparation method for Solution A, Solution B and the biological solidification solution, and solidification effects of each group on a soil layer were explored under the same construction conditions. A spraying amount of each group was 2 L/m in a direction of the rows of grapevines, an ambient temperature during spraying was 5-10° C., the spraying was performed within 1 h after Solution A and Solution B were mixed, and a spraying method was continuous spraying for a same piece of land. One month later, surface infiltration strength of a solidified soil body, as well as temperature, humidity and oxygen content around the grapevines inside the soil body were measured, and measurement results were shown in Table 1 below. Each group was subjected to two parallel tests, and results in the table were average values, rounded to one decimal place.

Group a: bean flour had a concentration of 0.5 g/L, xanthan gum had a concentration of 0.2 g/L, cellulose had a concentration of 0.2 g/L, and urea had a concentration of 0.5 g/L.

Group b: bean flour had a concentration of 0.5 g/L, xanthan gum had a concentration of 0.2 g/L, cellulose had a concentration of 0.2 g/L, and calcium chloride had a concentration of 0.5 g/L.

Group c: bean flour had a concentration of 0.5 g/L, xanthan gum had a concentration of 0.2 g/L, urea had a concentration of 0.5 g/L, and calcium chloride had a concentration of 0.5 g/L.

Group d: bean flour had a concentration of 0.5 g/L, cellulose had a concentration of 0.2 g/L, urea had a concentration of 0.5 g/L, and calcium chloride had a concentration of 0.5 g/L.

Group e: xanthan gum had a concentration of 0.2 g/L, cellulose had a concentration of 0.2 g/L, urea had a concentration of 0.5 g/L, and calcium chloride had a concentration of 0.5 g/L.

Group f: bean flour had a concentration of 0.5 g/L, xanthan gum had a concentration of 0.2 g/L, and cellulose had a concentration of 0.2 g/L.

Group g: bean flour had a concentration of 0.5 g/L, urea had a concentration of 0.5 g/L, and calcium chloride had a concentration of 0.5 g/L.

Group h: bean flour had a concentration of 0.5 g/L, and xanthan gum had a concentration of 0.2 g/L.

Group i: bean flour had a concentration of 0.5 g/L, and cellulose had a concentration of 0.2 g/L.

Group j: xanthan gum had a concentration of 0.2 g/L, and cellulose had a concentration of 0.2 g/L.

Group k: xanthan gum had a concentration of 0.2 g/L.

Group l: cellulose had a concentration of 0.2 g/L.

Control Group: bean flour had a concentration of 0.5 g/L, xanthan gum had a concentration of 0.2 g/L, cellulose had a concentration of 0.2 g/L, urea had a concentration of 0.5 g/L, and calcium chloride had a concentration of 0.5 g/L.

TABLE 1

| Group No. | Surface infiltration strength of the soil body (kPa) | Average temperature around the grapevines inside the soil body (° C.) | Average humidity inside the soil body around the grapevines (% RH) | Average oxygen content inside the soil body around the grapevines (%) |
|---|---|---|---|---|
| a | 70.2 | 2.9 | 34.4 | 14.9 |
| b | 68.1 | 2.7 | 33.9 | 15.4 |
| c | 103.8 | 3.4 | 35.1 | 13.9 |
| d | 100.3 | 3.6 | 35.0 | 16.1 |
| e | 68.9 | 2.8 | 33.7 | 15.2 |
| f | 67.6 | 3.0 | 33.5 | 13.8 |
| g | 48.4 | 2.3 | 32.6 | 14.4 |
| h | 57.5 | 2.5 | 33.2 | 15.1 |
| i | 53.4 | 2.7 | 33.0 | 15.5 |
| j | 67.6 | 2.9 | 33.8 | 13.2 |
| k | 55.9 | 2.8 | 33.1 | 15.2 |
| l | 49.2 | 2.4 | 32.8 | 15.9 |
| Control | 125.3 | 3.9 | 35.6 | 15.3 |

Results of a series of tests of the present disclosure indicated that the effects of tests by using the bean flour, the xanthan gum, by cellulose, the urea, and the calcium chloride separately at the above concentrations, or the effects of tests by pre-mixing any 1-4 of the components at the above concentrations are significantly weaker the solidification, thermal and moisture insulation effects on the soil by pre-mixing all of the five components, indicating that the composition of the above components in the biological solidification solution of the present disclosure had a synergistic effect.

Example 3 Investigate Spraying Time of the Biological Solidification Solution Furthermore, optimal the spraying time of the biological solidification solution was investigated in the present disclosure. In order to maximize the solidification and cold resistance effects of the biological solidification solution in the soil, investigation of the optimal the spraying time of the biological solidification solution was investigated. The biological solidification solution was continuously sprayed onto a soil body at intervals of 0 min, 15 min, 30 min, 45 min, 60 min, 75 min, and 90 min after the biological solidification solution was prepared. One month later, the surface infiltration strength of the solidified soil, temperature, humidity, and oxygen content around the grapevines inside the soil body were recorded.

Group 1: composition and concentration of the biological solidification solution: 0.5 g/L of bean flour, 0.2 g/L of xanthan gum, 0.2 g/L of cellulose, 0.5 g/L of urea, and 0.5 g/L of calcium chloride; a spraying amount was 3 L/m in a direction of rows of the grapevines, and an ambient temperature during spraying was 5-10° C.

Group 2: composition and concentration of the biological solidification solution: 2 g/L of bean flour, 1 g/L of xanthan gum, 1 g/L of cellulose, 2 g/L of urea, and 2 g/L of calcium chloride; a spraying amount was 5 L/m in a direction of rows of the grapevines, and an ambient temperature during spraying was 5-10° C.

Investigation results of Group 1 and Group 2 were shown in Tables 2 and 3, respectively.

It can be seen that after the biological solidification solution is prepared, effects of soil solidification gradually decreases over time. The effects of soil solidification drop rapidly after 1 h of mixing. Therefore, in order to ensure the quality of soil solidification, and in turn to guarantee the long-term cold and wind resistance, and reduce the amount of solution used, it is recommended to complete the spraying within 1 h after Solution A and Solution B are mixed. The solution should be prepared and used immediately.

In addition, the ambient temperature during spraying should ensure that the biological solidification solution is in a liquid state, such as above 0° C., preferably above 5° C., as too low a temperature, such as below freezing, would lead to poor fluidity of the biological solidification solution, thereby affecting its combination with the soil for solidification.

Example 4 Investigate a Number of Spraying Applications of the Biological Solidification Solution Furthermore, effects of continuous spraying and spraying in various application of the biological solidification solution on the soil-covered layer were investigated in the present disclosure. Formulae of Group 1 and Group 2 in the table above were used for both continuous spraying and spraying in two separate applications, a total spraying amount was 5 L/m in a direction of rows of the grapevines, and an ambient temperature during spraying was 5-10° C. Solution A and Solution B were mixed and used immediately. Three sets of parallel tests were performed on Group 1 and Group 2, respectively. Tables 4 and 5 were test results obtained after 1 month of treatment with a formula of Group 1 and a formula of Group 2, respectively, and values therein were average values.

TABLE 2

| Spraying time (min) | Surface infiltration strength of the soil body (kPa) | Temperature inside the soil body around the grapevines (° C.) | Humidity inside the soil body around the grapevines (% RH) | Oxygen content inside the soil body around the grapevines (%) |
| --- | --- | --- | --- | --- |
| 0  | 137.6 | 4.1 | 36.1 | 15.3 |
| 15 | 129.4 | 3.9 | 35.5 | 15.4 |
| 30 | 123.5 | 3.9 | 35.6 | 14.9 |
| 45 | 109.8 | 3.7 | 35.2 | 15.7 |
| 60 | 98.4  | 3.6 | 35.0 | 15.2 |
| 75 | 77.1  | 3.2 | 34.8 | 15.3 |
| 90 | 55.8  | 3.0 | 33.4 | 15.4 |

TABLE 3

| Spraying time (min) | Surface infiltration strength of the soil body (kPa) | Temperature inside the soil body around the grapevines (° C.) | Humidity inside the soil body around the grapevines (% RH) | Oxygen content inside the soil body around the grapevines (%) |
| --- | --- | --- | --- | --- |
| 0  | 267.3 | 5.1 | 36.2 | 15.1 |
| 15 | 261.6 | 5.0 | 36.0 | 15.4 |
| 30 | 250.4 | 4.9 | 36.0 | 14.8 |
| 45 | 248.1 | 4.9 | 35.9 | 13.2 |
| 60 | 236.5 | 4.9 | 35.8 | 15.2 |
| 75 | 202.9 | 4.7 | 35.6 | 16.1 |
| 90 | 172.2 | 4.6 | 35.5 | 14.9 |

TABLE 4

| Interval of spraying time (min) | Surface infiltration strength of the soil body (kPa) | Temperature inside the soil body around the grapevines (° C.) | Humidity inside the soil body around the grapevines (% RH) | Oxygen content inside the soil body around the grapevines (%) |
| --- | --- | --- | --- | --- |
| 0, that is, continuous spraying | 160.3 | 4.6 | 36.0 | 15.1 |
| 5, spraying in two separate applications | 167.2 | 4.6 | 36.0 | 15.1 |
| 7, spraying in two separate applications | 171.4 | 4.7 | 36.1 | 15.2 |
| 10, spraying in two separate applications | 156.4 | 4.6 | 35.9 | 14.9 |
| 20, spraying in two separate applications | 139.8 | 4.5 | 35.6 | 15.0 |

TABLE 5

| Interval of spraying time (min) | Surface infiltration strength of the soil body (kPa) | Temperature inside the soil body around the grapevines (° C.) | Humidity inside the soil body around the grapevines (% RH) | Oxygen content inside the soil body around the grapevines (%) |
| --- | --- | --- | --- | --- |
| 0, that is, continuous spraying | 264.9 | 5.0 | 36.1 | 15.3 |
| 5, spraying in two separate applications | 273.5 | 5.1 | 36.2 | 14.9 |
| 7, spraying in two separate applications | 279.4 | 5.1 | 36.2 | 15.1 |
| 10, spraying in two separate applications | 260.3 | 4.9 | 35.9 | 14.5 |
| 20, spraying in two separate applications | 239.8 | 4.8 | 35.9 | 15.2 |

From the data in Tables 4 and 5, it can be seen that spraying in two separate applications within a short period of time, for example, such as spraying in an interval of 5 min or 7 min, can actually improve the solidification effects of the soil, which is probably contributed to the concentration of biological solidification solution sprayed in two separate applications in surface soil, and an increasing local concentration improves the stabilization effects. However, when the interval becomes longer, such as 10 min, the soil solidification effects become weaker than continuous spraying, which probably results from a preliminary solidification state of the soil prevents more biological solidification solution from participating in the solidification process. Therefore, the present disclosure recommends a spraying method of either spraying in two separate applications within 7 min or continuous spraying.

Comparative Example 1 Spray No Biological Solidification Solution

In November 2022, a cold protection method for overwintering of grapevines using biological solidification solution was carried out on grapevines with a planting length of 20 m at Plot X in Vineyard Base 3 of the Xige Estate in Yinchuan, Ningxia Hui Autonomous Region, including the following steps:

(1) dead branches and leaves were pruned from the grapevines according to a given yield indicator in a timely manner, and were removed from the vineyard;
(2) grapevines were sorted out, and the grapevines on grape trellis were pressed in a same direction down onto a ground, specifically, a base of one grapevine was pressed down onto the grapevine behind, branches incapable of being be pressed down could be pressed down with soil or bundled with ropes to make then close to the ground; and
(3) soil between rows of the grapevines was dug up by a tilling machine and turned over to cover the grapevines, the buried soil was trimmed into an isosceles triangle with a cross-sectional base of 1800 mm, a distance from a top of the soil-covered layer to the grapevines was 150 mm, erosion pins, temperature and humidity recording probes, and soil fiber optical oxygen sensors were inserted into the soil-covered layer to monitor soil surface wind erosion, temperature, humidity, and oxygen content around the grapevines.

An ambient temperature of the above operations was 0° C.-8° C.

After 4 months of the treatment started in November 2022, that is, in March 2023, the soil-covered layer had been largely eroded by the wind, leaving most of the grapevines exposed and frost-damaged. Follow-up investigation indicated that only 20% of the grape trees sprouted and grew well due to the poor cold protection effects.

Comparative Example 2 Use a Lower Concentration of Biological Solidification Solution In November 2022, a cold protection method for overwintering of grapevines using biological solidification solution was carried out on grapevines with a planting length of 20 m at Plot Y in Vineyard Base 3 of the Xige Estate in Yinchuan, Ningxia Hui Autonomous Region, including the following steps:
(1) dead branches and leaves were pruned from the grapevines according to a given yield indicator in a timely manner, and were removed from the vineyard;
(2) grapevines were sorted out, and the grapevines on grape trellis were pressed in a same direction down onto a ground, specifically, a base of one grapevine was pressed down onto the grapevine behind, branches incapable of being be pressed down could be pressed down with soil or bundled with ropes to make then close to the ground; and
(3) soil between rows of the grapevines was dug up by a tilling machine and turned over to cover the grapevines, the buried soil was trimmed into an isosceles triangle with a cross-sectional base of 1200 mm, a distance from a top of the soil-covered layer to the grapevines was 50 mm, erosion pins, temperature and humidity recording probes, and soil fiber optical oxygen sensors were inserted into the soil-covered layer to monitor soil surface wind erosion, temperature, humidity, and oxygen content around the grapevines;
(4) soybean flour with a particle size less than 0.075 mm, xanthan gum, and cellulose were dissolved into water to obtain Solution A, where the bean flour had a concentration of 0.8 g/L, the xanthan gum had a concentration of 0.4 g/L, and the cellulose had a concentration of 0.4 g/L;
(5) urea and calcium chloride were fully dissolved into water to obtain Solution B, where the urea and the calcium chloride had concentrations of 0.8 g/L and 0.8 g/L, respectively;
(6) Solution A and Solution B were mixed evenly in a volume ratio of 1:1 to the biological solidification solution; and
(7) after completion of preparation, the biological solidification solution was immediately loaded into agricultural spraying equipment, and sprayed evenly and continuously over a surface of the soil-covered layer, a spraying amount of the biological solidification solution was 2 L/m in a direction of the rows of grapevines, the prepared biological solidification solution was sprayed within 1 h after completion of preparation, and the biological solidification solution was prepared immediately before use.

An ambient temperature of the above operations was 0° C.-8° C.

After 4 months of the treatment started in November 2022, that is, in March 2023, the soil-covered layer had been almost totally eroded by the wind, all of the grapevines were exposed and frost-damaged. Follow-up investigation indicated that no grape trees have sprouted and survived.

Comparative Example 3 Use a Higher Concentration of Biological Solidification Solution In November 2022, a cold protection method for overwintering of grapevines using biological solidification solution was carried out on grapevines with a planting length of 20 m at Plot Z in Vineyard Base 3 of the Xige Estate in Yinchuan, Ningxia Hui Autonomous Region, including the following steps:
(1) dead branches and leaves were pruned from the grapevines according to a given yield indicator in a timely manner, and were removed from the vineyard;
(2) grapevines were sorted out, and the grapevines on grape trellis were pressed in a same direction down onto a ground, specifically, a base of one grapevine was pressed down onto the grapevine behind, branches incapable of being be pressed down could be pressed down with soil or bundled with ropes to make then close to the ground; and
(3) soil between rows of the grapevines was dug up by a tilling machine and turned over to cover the grapevines, the buried soil was trimmed into an isosceles triangle with a cross-sectional base of 1200 mm, a distance from a top of the soil-covered layer to the grapevines was 50 mm, erosion pins, temperature and humidity recording probes, and soil fiber optical oxygen sensors were inserted into the soil-covered layer to monitor soil surface wind erosion, temperature, humidity, and oxygen content around the grapevines;
(4) soybean flour with a particle size less than 0.075 mm, xanthan gum, and cellulose were dissolved into water to obtain Solution A, where the bean flour had a concentration of 4.5 g/L, the xanthan gum had a concentration of 2.2 g/L, and the cellulose had a concentration of 2 g/L;
(5) urea and calcium chloride were fully dissolved into water to obtain Solution B, where the urea and the calcium chloride had concentrations of 4.5 g/L and 4 g/L, respectively;
(6) Solution A and Solution B were mixed evenly in a volume ratio of 1:1 to the biological solidification solution; and
(7) after completion of preparation, the biological solidification solution was immediately loaded into agricultural spraying equipment, and sprayed evenly and continuously over a surface of the soil-covered layer, a spraying amount of the biological solidification solution was 2 L/m in a direction of the rows of grapevines, the prepared biological solidification solution was sprayed within 1 h after completion of preparation, and the biological solidification solution was prepared immediately before use.

An ambient temperature of the above operations was 0° C.-8° C.

After 4 months of the treatment started in November 2022, that is, in March 2023, the soil-covered layer using the method remained largely intact, the soil surface wind erosion was 0, an average temperature around the grapevines inside the soil 5.9° C. (with a test ambient temperature of 10° C.), an average humidity was 36.1% RH, an average oxygen content was 15.2%, and surface infiltration strength measured on the soil-covered layer was 270.3 kPa; water-soluble monocalcium phosphate solution with a concentration of 0.5 g/L was sprayed at a spraying amount of at 3 L/m in a direction of rows of the grapevines to desolidify the soil, and the buried soil was then dug up to identify states of the grapevines. Follow-up investigation indicated only 70% of the grape trees grew well, the reason was that a high salt solution concentration in the biological solidification solution inhibited the sprouting and growth of the grapevines.

Comparative Example 4 Use a Higher Concentration of Biological Solidification Solution In November 2022, a cold protection method for overwintering of grapevines using biological solidification solution was carried out on grapevines with a planting length of 20 m at Plot W in Vineyard Base 3 of the Xige Estate in Yinchuan, Ningxia Hui Autonomous Region, including the following steps:

(1) dead branches and leaves were pruned from the grapevines according to a given yield indicator in a timely manner, and were removed from the vineyard;

(2) grapevines were sorted out, and the grapevines on grape trellis were pressed in a same direction down onto a ground, specifically, a base of one grapevine was pressed down onto the grapevine behind, branches incapable of being be pressed down could be pressed down with soil or bundled with ropes to make then close to the ground; and (3) soil between rows of the grapevines was dug up by a tilling machine and turned over to cover the grapevines, the buried soil was trimmed into an isosceles triangle with a cross-sectional base of 1200 mm, a distance from a top of the soil-covered layer to the grapevines was 50 mm, erosion pins, temperature and humidity recording probes, and soil fiber optical oxygen sensors were inserted into the soil-covered layer to monitor soil surface wind erosion, temperature, humidity, and oxygen content around the grapevines;

(4) soybean flour with a particle size less than 0.075 mm, xanthan gum, and cellulose were dissolved into water to obtain Solution A, where the bean flour had a concentration of 8 g/L, the xanthan gum had a concentration of 2.2 g/L, and the cellulose had a concentration of 2 g/L;

(5) urea and calcium chloride were fully dissolved into water to obtain Solution B, where the urea and the calcium chloride had concentrations of 6 g/L and 6 g/L, respectively;

(6) Solution A and Solution B were mixed evenly in a volume ratio of 1:1 to the biological solidification solution; and (7) after completion of preparation, the biological solidification solution was immediately loaded into agricultural spraying equipment, and sprayed evenly and continuously over a surface of the soil-covered layer, a spraying amount of the biological solidification solution was 2 L/m in a direction of the rows of grapevines, the prepared biological solidification solution was sprayed within 1 h after completion of preparation, and the biological solidification solution was prepared immediately before use.

An ambient temperature of the above operations was 0° C.-5° C.

After 4 months of the treatment started in November 2022, that is, in March 2023, the soil-covered layer using the method remained largely intact, the soil surface wind erosion was 0, an average temperature around the grapevines inside the soil 6.3° C. (with a test ambient temperature of 10° C.), an average humidity was 36.9% RH, an average oxygen content was 15.2%, and surface infiltration strength measured on the soil-covered layer was 302.1 kPa; water-soluble monocalcium phosphate solution with a concentration of 1 g/L was sprayed at a spraying amount of at 5 L/m in a direction of rows of the grapevines to desolidify the soil, but the soil body was not desolidified, the solidified layer and buried soil were dug up to identify states of the grapevines; and follow-up investigation indicated only 50% of the grape trees grew well, the reason was that a higher salt solution concentration in the biological solidification solution caused severe damage to the grapevines.

Example 5 Field Application of the Cold Protection Method of the Present Disclosure In November 2022, a cold protection method for overwintering of grapevines using biological solidification solution was carried out on grapevines with a planting length of 70 m at Plot A in Vineyard Base 3 of the Xige Estate in Yinchuan, Ningxia Hui Autonomous Region, including the following steps:

(1) dead branches and leaves were pruned from the grapevines according to a given yield indicator in a timely manner, and were removed from the vineyard;

(2) grapevines were sorted out, and the grapevines on grape trellis were pressed in a same direction down onto a ground, specifically, a base of one grapevine was pressed down onto the grapevine behind, branches incapable of being be pressed down could be pressed down with soil or bundled with ropes to make then close to the ground; and (3) soil between rows of the grapevines was dug up by a tilling machine and turned over to cover the grapevines, the buried soil was trimmed into an isosceles triangle with a cross-sectional base of 1200 mm, a distance from a top of the soil-covered layer to the grapevines was 50 mm, erosion pins, temperature and humidity recording probes, and soil fiber optical oxygen sensors were inserted into the soil-covered layer to monitor soil surface wind erosion, temperature, humidity, and oxygen content around the grapevines;

(4) soybean flour with a particle size less than 0.075 mm, xanthan gum, and cellulose were dissolved into water to obtain Solution A, where the bean flour had a concentration of 1 g/L, the xanthan gum had a concentration of 0.4 g/L, and the cellulose had a concentration of 0.4 g/L;

(5) urea and calcium chloride were fully dissolved into water to obtain Solution B, where the urea and the calcium chloride had concentrations of 1 g/L and 1 g/L, respectively;

(6) Solution A and Solution B were mixed evenly in a volume ratio of 1:1 to the biological solidification solution; and (7) after completion of preparation, the biological solidification solution was immediately loaded into agricultural spraying equipment, and sprayed evenly and continuously over a surface of the soil-covered layer, a spraying amount of the biological solidification solution was 2 L/m in a direction of the rows of grapevines, the prepared biological solidification solution was sprayed within 1 h after completion of preparation, and the biological solidification solution was prepared immediately before use.

An ambient temperature of the above operations was 0° C.-5° C.

After 4 months of the treatment started in November 2022, that is, in March 2023, the soil-covered layer using the method remained largely intact, as shown in FIG. 3A and FIG. 3B, the soil surface wind erosion was 0, an average temperature around the grapevines inside the soil 4.5° C. (with a test ambient temperature of 10° C.), an average humidity was 35.5% RH, an average oxygen content was 15.2%, and surface infiltration strength measured on the soil-covered layer was 54.7 kPa; water-soluble monocalcium phosphate solution with a concentration of 0.5 g/L was sprayed at a spraying amount of at 3 L/m in a direction of rows of the grapevines to desolidify the soil, and the buried soil was then dug up to identify states of the grapevines; and inspection proved that all of the grape trees were alive, follow-up investigation indicated that the grape trees grew well. Therefore, the method of the present disclosure effectively protected the grapevines over the winter, with efficiency of 100%.

Example 6 Field Application of the Cold Protection Method of the Present Disclosure In November 2022, a cold protection method for overwintering of grapevines using biological solidification solution was carried out on grapevines with a planting length of 20 m at Plot B in Vineyard Base 3 of the Xige Estate in Yinchuan, Ningxia Hui Autonomous Region, including the following steps:
(1) dead branches and leaves were pruned from the grapevines according to a given yield indicator in a timely manner, and were removed from the vineyard;
(2) grapevines were sorted out, and the grapevines on grape trellis were pressed in a same direction down onto a ground, specifically, a base of one grapevine was pressed down onto the grapevine behind, branches incapable of being be pressed down could be pressed down with soil or bundled with ropes to make then close to the ground; and
(3) soil between rows of the grapevines was dug up by a tilling machine and turned over to cover the grapevines, the buried soil was trimmed into an isosceles triangle with a cross-sectional base of 1800 mm, a distance from a top of the soil-covered layer to the grapevines was 100 mm, erosion pins, temperature and humidity recording probes, and soil fiber optical oxygen sensors were inserted into the soil-covered layer to monitor soil surface wind erosion, temperature, humidity, and oxygen content around the grapevines;
(4) soybean flour with a particle size less than 0.075 mm after sieving, xanthan gum, and cellulose were dissolved into water to obtain Solution A, where the bean flour had a concentration of 4 g/L, the xanthan gum had a concentration of 2 g/L, and the cellulose had a concentration of 2 g/L;
(5) urea and calcium chloride were fully dissolved into water to obtain Solution B, where the urea and the calcium chloride had concentrations of 4 g/L and 4 g/L, respectively;
(6) Solution A and Solution B were mixed evenly in a volume ratio of 1:1 to the biological solidification solution; and
(7) after completion of preparation, the biological solidification solution was immediately loaded into agricultural spraying equipment, and sprayed evenly and continuously over a surface of the soil-covered layer, a spraying amount of the biological solidification solution was 5 L/m in a direction of the rows of grapevines, the prepared biological solidification solution was sprayed within 1 h after completion of preparation, and the biological solidification solution was prepared immediately before use.

The above operations were all performed during a period of time when a temperature was above zero during the day.

After 4 months of the treatment started in November 2022, that is, in March 2023, the soil-covered layer using the method remained largely intact, as shown in FIG. 4A and FIG. 4B, the soil surface wind erosion was 0, an average temperature around the grapevines inside the soil 5.7° C. (with a test ambient temperature of 10° C.), an average humidity was 36.1% RH, an average oxygen content was 15.3%, and surface infiltration strength measured on the soil-covered layer was 239.1 kPa; water-soluble monocalcium phosphate solution with a concentration of 1 g/L was sprayed at a spraying amount of at 4 L/m in a direction of rows of the grapevines to desolidify the soil, and the buried soil was then dug up to identify states of the grapevines; and inspection proved that all of the grape trees were alive, follow-up investigation indicated that the grape trees grew well. Therefore, the method of the present disclosure effectively protected the grapevines over the winter, with efficiency of 100%.

Example 7 Field Application of the Cold Protection Method of the Present Disclosure In November 2022, a cold protection method for overwintering of grapevines using biological solidification solution was carried out on grapevines with a planting length of 20 m in Vineyard Base 3 of the Xige Estate in Yinchuan, Ningxia Hui Autonomous Region, including the following steps:
(1) dead branches and leaves were pruned from the grapevines according to a given yield indicator in a timely manner, and were removed from the vineyard;
(2) grapevines were sorted out, and the grapevines on grape trellis were pressed in a same direction down onto a ground, specifically, a base of one grapevine was pressed down onto the grapevine behind, branches incapable of being be pressed down could be pressed down with soil or bundled with ropes to make then close to the ground; and
(3) soil between rows of the grapevines was dug up by a tilling machine and turned over to cover the grapevines, the buried soil was trimmed into an isosceles trapezoid with a cross-section bottom edge of 1800 mm and a top edge of 400 mm, a distance from a top of the soil-covered layer to the grapevines was 100 mm, erosion pins, temperature and humidity recording probes, and soil fiber optical oxygen sensors were inserted into the soil-covered layer to monitor soil surface wind erosion, temperature, humidity, and oxygen content around the grapevines;
(4) sword bean flour with a particle size less than 0.075 mm, xanthan gum, and cellulose were dissolved into water to obtain Solution A, where the bean flour had a concentration of 1 g/L, the xanthan gum had a concentration of 1 g/L, and the cellulose had a concentration of 1 g/L;
(5) urea and calcium chloride were fully dissolved into water to obtain Solution B, where the urea and the calcium chloride had concentrations of 1 g/L and 1 g/L, respectively;
(6) Solution A and Solution B were mixed evenly in a volume ratio of 1:1 to the biological solidification solution; and
(7) after completion of preparation, the biological solidification solution was immediately loaded into agricultural spraying equipment, and sprayed evenly and continuously over a surface of the soil-covered layer, a spraying amount of the biological solidification solution was 2 L/m in a direction of the rows of grapevines, the prepared biological solidification solution was sprayed within 1 h after completion of preparation, and the biological solidification solution was prepared immediately before use.

The above operations were all performed during a period of time when a temperature was above zero during the day.

Figure 5A:
FIG. 5A and FIG. 5B are comparison images after Plot C treated according to Example 7 of the present disclosure at an interval of 4 months.
Figure 5B:

After 4 months of the treatment started in November 2022, that is, in March 2023, the soil-covered layer using the method remained largely intact, as shown in FIG. 5A and FIG. 5B, the soil surface wind erosion was 0, an average temperature around the grapevines inside the soil 4.9° C. (with a test ambient temperature of 10° C.), an average humidity was 35.4% RH, an average oxygen content was 15.1%, and surface infiltration strength measured on the soil-covered layer was 83.8 kPa; water-soluble monocalcium phosphate solution with a concentration of 0.5 g/L was sprayed at a spraying amount of at 2 L/m in a direction of rows of the grapevines to desolidify the soil, and the buried soil was then dug up to identify states of the grapevines; and inspection proved that all of the grape trees were alive, follow-up investigation indicated that the grape trees grew well. Therefore, the method of the present disclosure effectively protected the grapevines over the winter, with efficiency of 100%.

Example 8 Field Application of the Cold Protection Method of the Present Disclosure In November 2022, a cold protection method for overwintering of grapevines using biological solidification solution was carried out on grapevines with a planting length of 20 m in Vineyard Base 3 of the Xige Estate in Yinchuan, Ningxia Hui Autonomous Region, including the following steps:
(1) dead branches and leaves were pruned from the grapevines according to a given yield indicator in a timely manner, and were removed from the vineyard;
(2) grapevines were sorted out, and the grapevines on grape trellis were pressed in a same direction down onto a ground, specifically, a base of one grapevine was pressed down onto the grapevine behind, branches incapable of being be pressed down could be pressed down with soil or bundled with ropes to make then close to the ground; and
(3) soil between rows of the grapevines was dug up by a tilling machine and turned over to cover the grapevines, the buried soil was trimmed into an isosceles trapezoid with a cross-section bottom edge of 1200 mm and a top edge of 300 mm, a distance from a top of the soil-covered layer to the grapevines was 50 mm, erosion pins, temperature and humidity recording probes, and soil fiber optical oxygen sensors were inserted into the soil-covered layer to monitor soil surface wind erosion, temperature, humidity, and oxygen content around the grapevines;
(4) sword bean flour with a particle size less than 0.075 mm, xanthan gum, and cellulose were dissolved into water to obtain Solution A, where the bean flour had a concentration of 4 g/L, the xanthan gum had a concentration of 1.5 g/L, and the cellulose had a concentration of 2 g/L;
(5) urea and calcium chloride were fully dissolved into water to obtain Solution B, where the urea and the calcium chloride had concentrations of 4 g/L and 3.2 g/L, respectively;
(6) Solution A and Solution B were mixed evenly in a volume ratio of 1:1 to the biological solidification solution; and
(7) after completion of preparation, the biological solidification solution was immediately loaded into agricultural spraying equipment, and sprayed evenly and continuously over a surface of the soil-covered layer, a spraying amount of the biological solidification solution was 5 L/m in a direction of the rows of grapevines, the prepared biological solidification solution was sprayed within 1 h after completion of preparation, and the biological solidification solution was prepared immediately before use.

The above operations were all performed during a period of time when a temperature was above zero during the day.

Figure 6A:
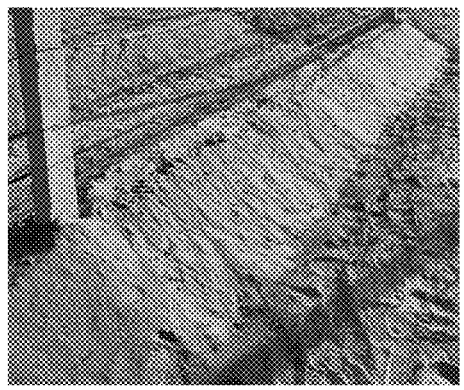
FIG. 6A and FIG. 6B are comparison images after Plot D treated according to Example 8 of the present disclosure at an interval of 4 months.
Figure 6B:
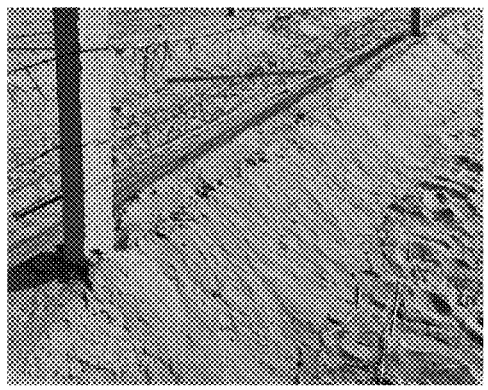

After 4 months of the treatment started in November 2022, that is, in March 2023, the soil-covered layer using the method remained largely intact, as shown in FIG. 6A and FIG. 6B, the soil surface wind erosion was 0, an average temperature around the grapevines inside the soil 5.9° C. (with a test ambient temperature of 10° C.), an average humidity was 36.2% RH, an average oxygen content was 14.9%, and surface infiltration strength measured on the soil-covered layer was 256 kPa. Water-soluble monocalcium phosphate solution with a concentration of 0.5 g/L was sprayed at a spraying amount of at 5 L/m in a direction of rows of the grapevines to desolidify the soil, and the buried soil was then dug up to identify states of the grapevines; and inspection proved that all of the grape trees were alive, follow-up investigation indicated that the grape trees grew well. Therefore, the method of the present disclosure effectively protected the grapevines over the winter, with efficiency of 100%.

The above specific embodiments are intended to explain and illustrate the present disclosure and are not intended to limit the present disclosure. Any modifications and variations made to the present disclosure within the subject matter and claims of the present disclosure shall fall within the scope of protection of the present disclosure.

What is claimed is:
1. A method for protecting vines, wherein the vines are covered with a biological solidification layer, comprising the following steps:
S1, placing stems of the vines in rows on a ground, and digging soil between the rows to cover the vines and stems in the rows to form a soil-covered layer; and a thickness of the soil-covered layer is such that a distance from the stems to a top of the soil-covered layer is 50-100 mm;
S2, preparing a biological solidification solution as follows:
mixing bean flour, xanthan gum, and cellulose together to obtain a first mixture, then stirring and dissolving the first mixture in water to obtain Solution A;
mixing urea and calcium chloride together to obtain a second mixture and then dissolving the second mixture in water to obtain Solution B; and
mixing the Solution A and the Solution B in a volume ratio of 1:1 to prepare the biological solidification solution,
wherein a composition and a concentration of the biological solidification solution are as follows: 0.5-2 g/L of the bean flour, 0.2-1 g/L of the xanthan gum, 0.2-1 g/L of the cellulose, 0.5-2 g/L of the urea and 0.5-2 g/L of the calcium chloride;
S3, spraying the biological solidification solution onto the soil-covered layer to form the biological solidification layer, wherein
a time after a preparation of the Solution A and a time after a preparation of the Solution B are not used as limiting conditions for a spraying time, and the spraying time of the biological solidification solution is limited to within one hour after the Solution A and the Solution B are mixed; and an ambient temperature during spraying should ensure that the biological solidification solution is in a liquid state; and S4, spraying a de-solidification solution onto the biological solidification layer after a protection is completed to desolidify the biological solidification layer and provide nutrients, wherein the de-solidification solution is composed of water-soluble monocalcium phosphate with a concentration of 0.5-1 g/L, and a use amount of the de-solidification solution is 2-5 L/m.

2. The method according to claim 1, wherein the vines are grapevines.

3. The method according to claim 1, wherein the bean flour in the biological solidification solution is a soybean flour or a sword bean flour with a particle size smaller than 0.075 mm.

4. The method according to claim 1, wherein the ambient temperature during spraying of the biological solidification solution is above 0° C.

5. The method according to claim 1, wherein a spraying amount of the biological solidification solution is 2-5 L/m in a direction of rows of grapevines.

6. The method according to claim 1, wherein a spraying method of the biological solidification solution is to spray a same soil-covered layer twice, and an interval between two spraying applications is no more than 7 min, such that a total spraying amount of the two spraying applications is controlled at 2-5 L/m in a direction of rows of grapevines.

7. The method according to claim 1, wherein a cross-sectional geometry of the soil-covered layer is triangular or trapezoidal, with a base length of 1200-1800 mm, and a top length is 30-40 mm when it is a trapezoid.

* * * * *